May 22, 1923.  G. E. DENNIS  1,456,367
SHOCK ABSORBER
Filed May 7, 1920   2 Sheets-Sheet 1
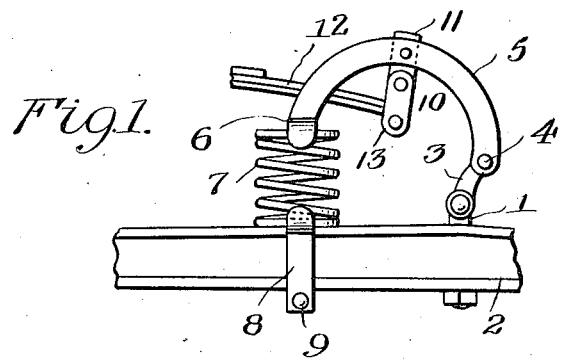
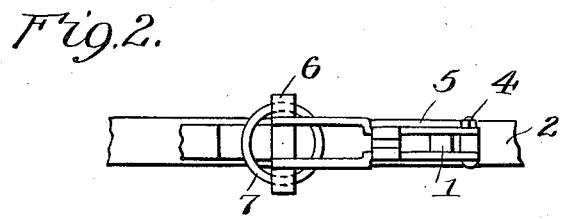
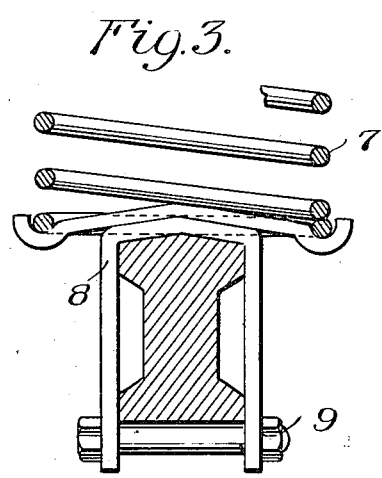
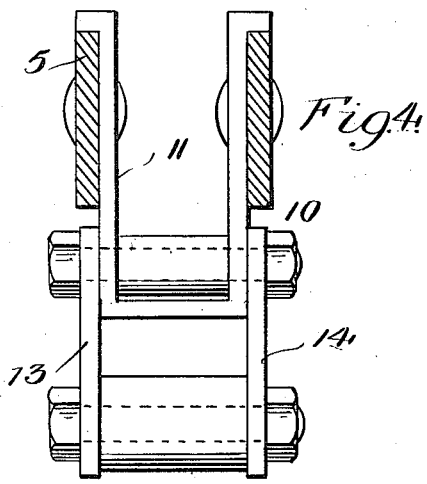
INVENTOR.
G. E. Dennis
BY Victor J. Evans
ATTORNEYS.

May 22, 1923.

G. E. DENNIS

SHOCK ABSORBER

Filed May 7, 1920

INVENTOR.
G. E. Dennis
BY
ATTORNEYS.

Patented May 22, 1923.

1,456,367

UNITED STATES PATENT OFFICE.

GEORGE E. DENNIS, OF WAUKESHA, WISCONSIN.

SHOCK ABSORBER.

Application filed May 7, 1920. Serial No. 379,620.

*To all whom it may concern:*

Be it known that I, GEORGE E. DENNIS, a citizen of the United States, residing at Waukesha, in the county of Waukesha and State of Wisconsin, have invented new and useful Improvements in Shock Absorbers, of which the following is a specification.

This invention relates to a shock absorber and more particularly to a shock absorber for giving more resiliency to automobile springs and has for its primary object the construction and arrangement of parts whereby the extra resiliency may be added to the usual automobile spring without interfering with the efficient operation of the latter.

An object of the invention is to provide yieldable means that will yieldably oppose downward movement of the body of the automobile, and further absorb the rebound of the latter.

A feature of the invention is the arrangement and association of parts whereby the full resilient action of the coil spring may be utilized.

With these and other objects in view the invention will be better understood from the following detailed description taken in connection with the accompanying drawing wherein:

Fig. 1 is a side elevation of my invention shown connected with one end of the well known "Ford" spring.

Fig. 2 is a top plan view.

Fig. 3 is a sectional view illustrating the bracket.

Fig. 4 is a sectional view illustrating the flexible connection.

Figure 5:
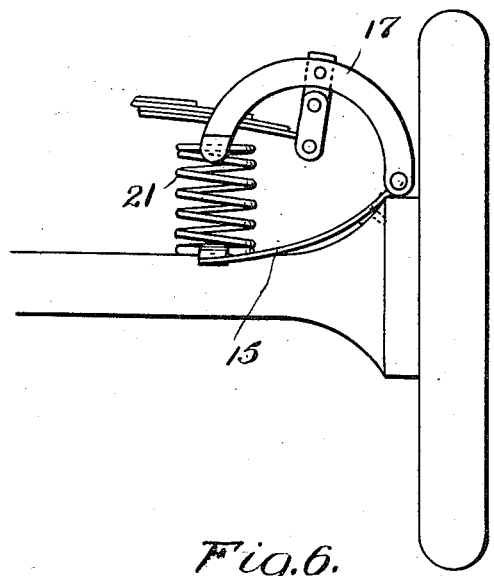
Fig. 5 is a side elevation of my invention attached to the rear axle.

Again referring to the drawing illustrating one construction of my invention the numeral 1 designates a usual "Ford" bolt secured to the axle 2 and further pivotally connected to the link 3. This link 3 has pivotal connection 4 with the arcuate shape arm 5 which forms one element of my invention. This arm 5 may be constructed in any suitable manner depending upon which is most advantageous in practice. The other end of the arm 5 is connected to a saddle 6 that engages a coil spring 7. This coil spring 7 is held seated on the axle 2 by a bracket 8 that is clamped in place by the bolt 9. Supported on the arm 5 is the clip 10 consisting of the clip member 11 straddling the arm and connected to one end of the automobile leaf spring 12 by links 13 and 14.

From the foregoing description taken in connection with the accompanying drawing it will be seen that in the use of my device the maximum amount of resiliency of the coil spring 7 is utilized and besides the end of the leaf spring 12 is flexibly and yieldably connected to the axle. A feature of my invention is that the connection of the parts is such that the connection between the arm 5 and spring 7 move faster than the connection between the leaf spring 12 and arm 5 so that the end of the leaf spring will be yieldably held against downward movement and besides a quick rebounding action of the spring 7 and striking of saddle 6 under spring 12 will efficiently absorb the rebound of the springs 12 and 7. Thus it will be seen that the up and down movements of the body of the machine are properly taken care of and the leaf spring 12 and axle 2 prevented from being subject to shocks and excessive strain. It will also be noted that my invention is such that the usual connection between the leaf spring and the axle of the Ford car may be utilized.

Figure 6:
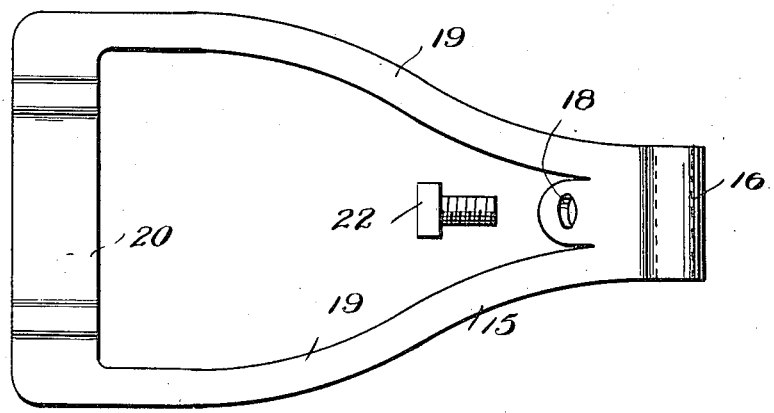
Fig. 6 is a detailed plan view of the rear axle attaching bracket.

In Figures 5 and 6 I have illustrated my invention constructed to be connected to the rear axle and to accomplish this in a most efficient manner I provide a particularly shaped bracket 15 having one end formed into a knuckle 16 pivotally connected to the arm 17 and stamped to provide an aperture ear 18, curved limbs 19, and a cross piece 20, which is of a shape to properly engage and hold in place the coil spring 21. A screw 22 passes through the ear 18 and has screw threaded engagement with the rear axle as clearly shown in Fig. 5.

In concluding I wish to call attention to the fact that I do not desire to be limited to the exact construction and association of parts as various changes may be made without departing from the invention, and therefore, I do not desire to be limited in any manner except as set forth in the claims hereunto appended.

Having thus described my invention what I claim is

1. In a shock absorber for motor vehicles, the combination with a vehicle axle and leaf spring, of a pair of arcuate arms, means pivotally connecting said arms to said axle, a cross bar carried by the ends of said arms remote from their pivotal connection and being shaped to form a downwardly opening saddle, a bracket carried by said axle, a spring rest on said bracket, a spiral spring engaged between said cross bar and spring rest, a substantially U-shaped member carried by said arcuate arms intermediate their ends, clips pivoted to said U-shaped member and connected to said leaf spring.

2. In a shock absorber for motor vehicles, the combination with a vehicle axle and leaf spring, of a stirrup shaped bracket adapted to rest upon said axle, means for connecting said bracket to said axle, said bracket having a spring seat formed thereon, a pair of arcuate arms pivotally connected at one end to said bracket remote from said spring seat and overhanging said bracket, a cross bar carried by the free ends of said arms, a spiral spring confined between said cross bar and spring seat, and means pivotally connecting said leaf spring to said arcuate arms intermediate their ends.

3. In a shock absorber for motor vehicles, the combination with a vehicle axle and leaf spring, of a stirrup shaped bracket adapted to rest upon said axle, means for connecting said bracket to said axle, said bracket having a spring seat formed thereon, a pair of arcuate arms pivotally connected at one end to said bracket remote from said spring seat and overhanging said bracket, a cross bar carried by the free ends of said arms, a spiral spring confined between said cross bar and spring seat, a substantially U-shaped member carried by said arcuate arms intermediate their ends, and clips pivoted to said U-shaped member and connected to said leaf spring.

In testimony whereof I affix my signature.

GEORGE E. DENNIS.